US006577735B1

(12) United States Patent
Bharat

(10) Patent No.: US 6,577,735 B1
(45) Date of Patent: Jun. 10, 2003

(54) SYSTEM AND METHOD FOR BACKING-UP DATA STORED ON A PORTABLE AUDIO PLAYER

(75) Inventor: Krishna Asur Bharat, San Jose, CA (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 0 days.

(21) Appl. No.: 09/327,998

(22) Filed: Jun. 8, 1999

Related U.S. Application Data

(60) Provisional application No. 60/119,977, filed on Feb. 12, 1999.

(51) Int. Cl.[7] ................................................. G06F 11/30
(52) U.S. Cl. ........................ 380/286; 713/153; 713/161; 713/165
(58) Field of Search ................................. 713/153, 161, 713/165, 168, 189, 193, 194, 200, 201; 380/286

(56) References Cited

U.S. PATENT DOCUMENTS

| | | | | |
|---|---|---|---|---|
| 4,433,207 A | * | 2/1984 | Best | 713/190 |
| 5,959,945 A | * | 9/1999 | Kleiman | 340/5.74 |
| 6,191,780 B1 | * | 2/2001 | Martin et al. | 705/15 |

* cited by examiner

*Primary Examiner*—Thomas R. Peeso
(74) *Attorney, Agent, or Firm*—Gary S. Williams; Pennie & Edmonds LLP

(57) ABSTRACT

A system creates an encrypted backup copy of the compressed audio data downloaded onto a portable audio player. When a user loads a portable audio player with audio data from a CD inserted into a computer's CD-ROM drive, the system creates an encrypted copy of the compressed audio data and stores the encrypted copy on the computer's hard disk. The encrypted copy cannot be used without a cryptographic key, but the system discards the cryptographic key once the encrypted copy of the audio data is stored. To extract usable audio data from the encrypted backup copy, it is necessary to re-insert the original CD and regenerate the cryptographic key. Once the cryptographic key is regenerated, the encrypted audio data can be decrypted and re-loaded onto the portable audio player.

22 Claims, 6 Drawing Sheets

Archive track file 400

SYSTEM AND METHOD FOR BACKING-UP DATA STORED ON A PORTABLE AUDIO PLAYER

This application claims benefit of provisional application Ser. No. 60/119,977 filed Feb. 12, 1999.

The present invention relates generally to a system and method for creating and using an encrypted back-up copy of the data stored on a portable audio player.

BACKGROUND OF THE INVENTION

Since the advent of the audio cassette, portable audio players have enjoyed widespread popularity. Portable audio players allow a user to listen to audio data in virtually any setting by freeing the user from the constraints imposed by bulky homebased stereo systems. Because portable audio players are often physically carried by the user, it is desirable to make them as small and lightweight as possible.

As a result of efforts to minimize their size and cost, portable audio players have traditionally had quite limited data storage capabilities. For example, most current portable audio players simply play the data stored on a single cassette tape or compact disk (CD) which is manually loaded into the player by the user. Most cassettes and CDs are capable of storing at most 70 to 75 minutes of high-quality audio data. Moreover, many of the cassettes and CDs that a user owns will contain even less data than this, since separate cassettes or CDs are typically used to record separate programs and events. Even with the advent of the digital video disk, or DVD, with a much greater storage capacity than a traditional CD, it will typically be the case that a user will own a library of many different disks, each disk containing its own unique set of data. Thus, to listen to several hours of audio data, or to listen to a variety of programs, a user must carry several tapes or CDs and manually load the next one into the player when the previous one is finished playing.

The development of effective compression techniques has enabled a greater quantity of audio data to be stored in a much smaller amount of memory. For example, the MPEG audio layer 3 compression format, or MP3, is able to compress CD-quality digital audio data by a factor of about ten, and thus enables a CD-quality audio signal to be delivered at a data rate of 128 kilobits per second. As a result, these compression techniques make it practical for a compressed audio player to use storage media other than traditional cassettes or disks—media that would otherwise be prohibitively expensive to use. For example, the Rio MP3 Software Player, made by Diamond Multimedia, stores data in a 32 megabyte flash memory, a type of non-volatile electronic memory that allows for writing and erasing of data. By making use of compression techniques, a user can thus store approximately 30 minutes of audio data in the flash memory, whereas without compression, only about 3 minutes of audio data could be stored. As another example, the portable audio player described in U.S. patent application Ser. No. 09/249,182, filed Feb. 12, 1999, entitled "System and Method for Playing Compressed Audio Data," now U.S. Pat. No. 6,377,530, uses a compact, high-capacity hard disk drive to store an even greater amount of data. For instance, one embodiment of this portable audio player uses a four gigabyte hard drive to store up to approximately sixty-five hours of compressed audio data, thus enabling the user to listen to a virtually unlimited supply of audio data without having to manually insert new disks.

Compressing and copying audio data from a CD to a portable audio player, however, is a cumbersome, time-consuming process. The audio data that is stored on the portable audio player is typically acquired from CDs, which are manually loaded into the user's personal computer and then compressed and downloaded into the portable audio player's memory. As an example, it takes about forty minutes for a 400 MHZ personal computer to compress (into MP3 format) and download a complete 75 minute audio CD. Moreover, if the portable audio player has a large capacity (e.g. 65 hours), the mere act of inserting numerous CD's into the personal computer will be quite labor intensive.

As a result, a user would be very upset if the compressed audio data stored on the portable audio player becomes corrupted or unreadable, as it would require the user to repeat the inconvenient, time-consuming process of loading data onto the audio player.

One way to minimize this inconvenience would be to keep a backup copy of the compressed audio data on the hard disk of the user's personal computer or on some other storage medium. However, making a duplicate copy of the compressed audio data would be prone to unauthorized access. In addition, the user may only be permitted by law or contract to make a single useable copy of certain CDs.

Accordingly, it is an object of the present invention to provide a system and method for reducing the time necessary to reload data onto a portable audio player, while avoiding the problems associated with creating a second readable copy of that data.

SUMMARY OF THE INVENTION

A portable jukebox programming subsystem is used in conjunction with a computer communicatively coupled to a portable jukebox player and to a source of audio data, such as a CD. The portable jukebox programming subsystem uses a compression module to compress a portion of the audio data from the CD into compressed audio data, and transfers the compressed audio data to the portable jukebox for storage therein.

An encryption key generator to generate an encryption key as a predefined function of the audio data. An encryption module is used to encrypt the compressed audio data using the encryption key, and to then discard the encryption key. The encrypted audio data is stored in the computer's memory in a backup file, and is not useable without the encryption key.

A backup recovery module is used to recover the encrypted backup file from the computer's memory. The backup recovery module includes an encryption key recovery module for regenerating the encryption key from the audio data when the original CD is communicatively re-coupled to the portable jukebox programming subsystem. A decryption module is used for decrypting the encrypted backup file with the regenerated encryption key to generate recovered compressed audio data, a transfer module is used for transferring the recovered compressed audio data to the portable jukebox.

In a preferred embodiment, the backup recovery module verifies the authenticity of the audio CD before decrypting the encrypted backup file. For instance, the information stored on the audio CD (or derived from the information stored on the audio CD) can be compared with corresponding information stored in the encrypted backup file. Alternately, the backup recovery module can decrypt some or all of the audio data in the encrypted backup file and then compare the decrypted audio data with data on the audio CD before enabling the decrypted audio data to be transferred to the portable jukebox.

In one embodiment, before decrypting audio data in a backup file; the backup recovery module verifies that the computer system is coupled to the same portable jukebox as was coupled to the computer when that backup file was generated. In this embodiment, each portable jukebox has a unique identifier (e.g., serial number) associated with it. An encrypted copy of the portable jukebox identifier is stored in a header portion of each backup file, and the backup recovery module decrypts and compares the portable jukebox identifier from the file header with the portable jukebox identifier of the portable jukebox coupled to the computer system.

BRIEF DESCRIPTION OF THE DRAWINGS

Additional objects and features of the invention will be more readily apparent from the following detailed description and appended claims when taken in conjunction with the drawings, in which:

DESCRIPTION OF THE PREFERRED EMBODIMENTS

The following embodiments of the present invention will be described in the context of a computer used to load compressed audio data onto a portable audio player, although those skilled in the art will recognize that the disclosed systems and methods are readily adaptable for broader application. For example, without limitation, the present invention could be readily applied in the context of a video, multimedia, or uncompressed audio player.

The present invention provides a system and method for securely backing up the compressed audio data stored on a portable audio player, thus minimizing the inconvenience of re-loading lost data onto the portable audio player, and avoiding the danger of illicit duplication. When a user loads a portable audio player with audio data from a compact disk inserted into a computer's CD-ROM drive, an encrypted copy of the audio data is stored on the computer's hard disk. This encrypted copy cannot be used without a cryptographic key, but this cryptographic key is discarded once the encrypted copy of the audio data is stored. Thus, the only way to extract usable audio data from the encrypted copy retained on the computer's hard drive is to re-insert the original CD and regenerate the cryptographic key. Once the cryptographic key is regenerated, the encrypted audio data can be decrypted and re-loaded onto the portable audio player.

Figure 1:
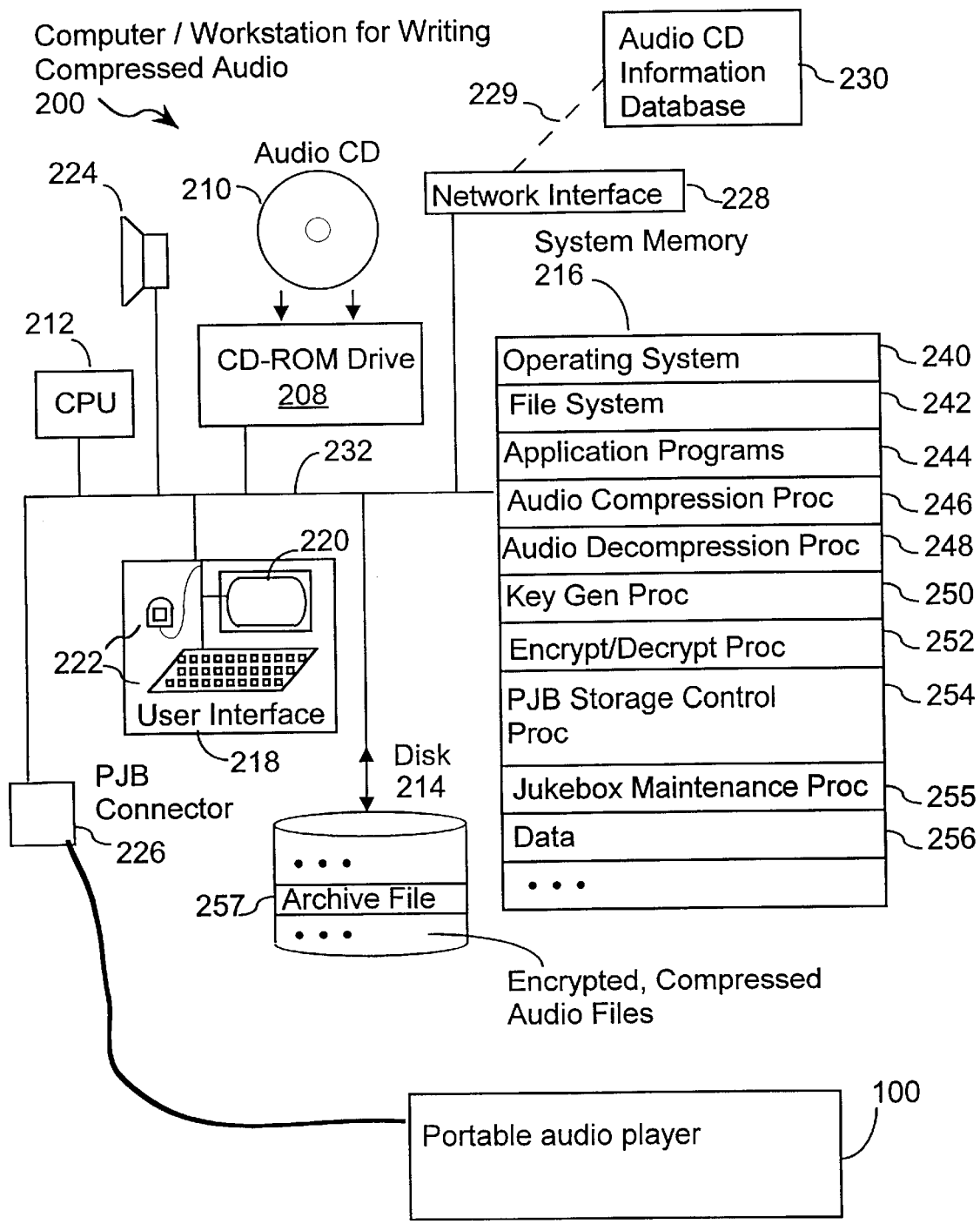
FIG. 1 is a block diagram of a system for loading data onto a portable audio player in accordance with the present invention.

FIG. 1 shows a system, such as computer workstation 200, for loading data onto a portable audio player 100 and storing an encrypted backup copy of the loaded data. The system preferably includes:

a CD-ROM drive 208 for receiving a CD 210 containing audio data;

a data processor 212;

a main non-volatile storage unit 214, preferably a hard disk drive, for storing archive files 257 of encrypted audio data from CD 210;

a system memory unit 216, preferably including both high speed random-access memory (RAM) and read-only memory (ROM), for storing system control programs, data, and application programs loaded from disk 214;

a user interface 218, including a display 220 and one or more input devices 222;

one or more speakers 224 for providing audio output;

a portable jukebox connector 226 for connecting the system 200 to a portable audio player 100, such as for downloading compressed audio data onto the portable audio player 100;

a network interface 228 for connecting system 200 to a network, such as the Internet 229, and for obtaining information regarding audio CDs from one or more external databases 230;

one or more internal buses 232 for interconnecting the aforementioned elements of the system.

The operation of system 200 is controlled primarily by control programs that are executed by the system's data processor 212. The system's control programs may be stored in system memory 216. In a typical implementation, the programs stored in the system memory will include:

an operating system 240;

a file handling system 242;

a set of user interface procedures 243, for handling input received from user interface 218 and displaying output to the user on display 220;

one or more application programs 244;

a compression procedure 246 for compressing audio data from audio CD 210;

a decompression procedure 248 for decompressing compressed audio data;

an encryption key generation procedure 250;

an encryption/decryption procedure 252 for encrypting audio data from CD 210, or compressed audio data returned by compression procedure 246;

a portable jukebox storage-control procedure 254, discussed in more detail below, for downloading a compressed copy of the data stored on audio CD 210 onto portable audio player 100, and for storing an encrypted backup copy of this compressed audio data on disk 214;

one or more portable jukebox maintenance procedures 255, for accessing the data stored within portable jukebox 100 and deleting tracks of data, downloading additional CDs and/or tracks, and replacing or updating the table of contents stored within portable jukebox 100.

In addition, system memory 216 will typically include one or more blocks of data 256, including, for example, portions of data from CD 210 that are being processed by the procedures described above. In addition, system memory may also include data downloaded from the Internet 229 via network interface 228, such as, for example, data regarding the identity and duration of the tracks of audio data stored on CD 210. System memory 216 may also include data generated by the procedures and programs stored therein. For example, system memory may contain a table of contents of CD 210 that is created during the execution of portable jukebox storage-control procedure 254.

Figure 2:
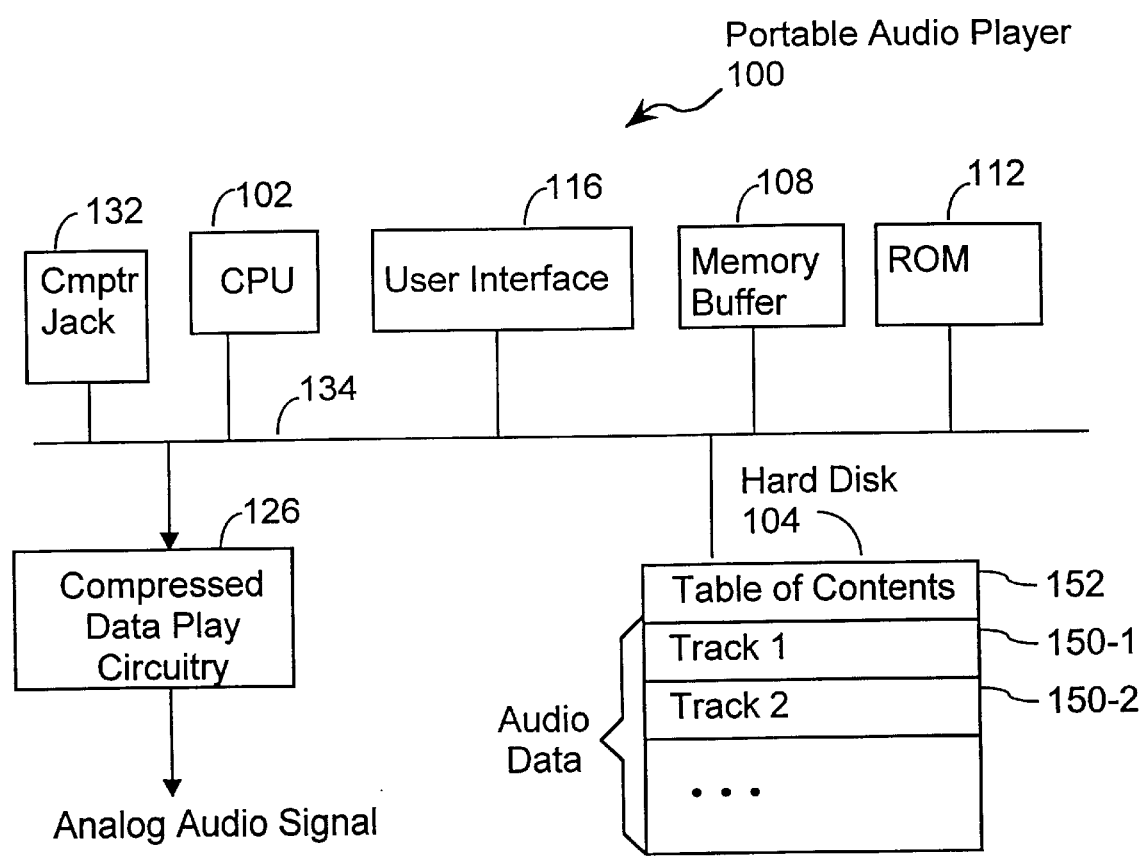
FIG. 2 is a block diagram of a portable audio player.

FIG. 2 is an illustration of an embodiment of a portable audio player in accordance with the present invention. Portable audio player 100 preferably includes:
- a central processing unit 102;
- a main non-volatile storage unit 104, preferably a hard disk drive;
- a volatile storage unit, or memory buffer, 108, preferably random access memory (RAM);
- a control memory module 112, preferably read only memory (ROM), which stores the control programs for the system;
- a user interface 116 for receiving commands from a user;
- compressed data play circuitry 126 for delivering an analog audio signal to a pair of headphones or another audio output device (not shown);
- a jack 132 for coupling the system 100 to a computer, such as workstation 200, for downloading compressed audio data onto the hard disk 104; and
- one or more internal buses 134 for interconnecting the aforementioned elements of the system.

The jack 132 of the portable audio player enables the workstation 200 to directly access the hard disk 104 of the portable audio player 100. In a preferred embodiment, the workstation 200 has read and write access to the hard disk 104, while the player only has read access to its own hard disk 104.

A more detailed description of the portable audio player can be found in U.S. patent application Ser. No. 09/249,182, filed Feb. 12, 1999, entitled "System and Method for Playing Compressed Audio Data," now U.S. Pat. No. 6,377,530, which is hereby incorporated by reference as background information.

Storing Audio Files in Portable Jukebox

The operation of workstation 200 will now be described with reference to FIGS. 3, 4 and 5.

Figure 3:
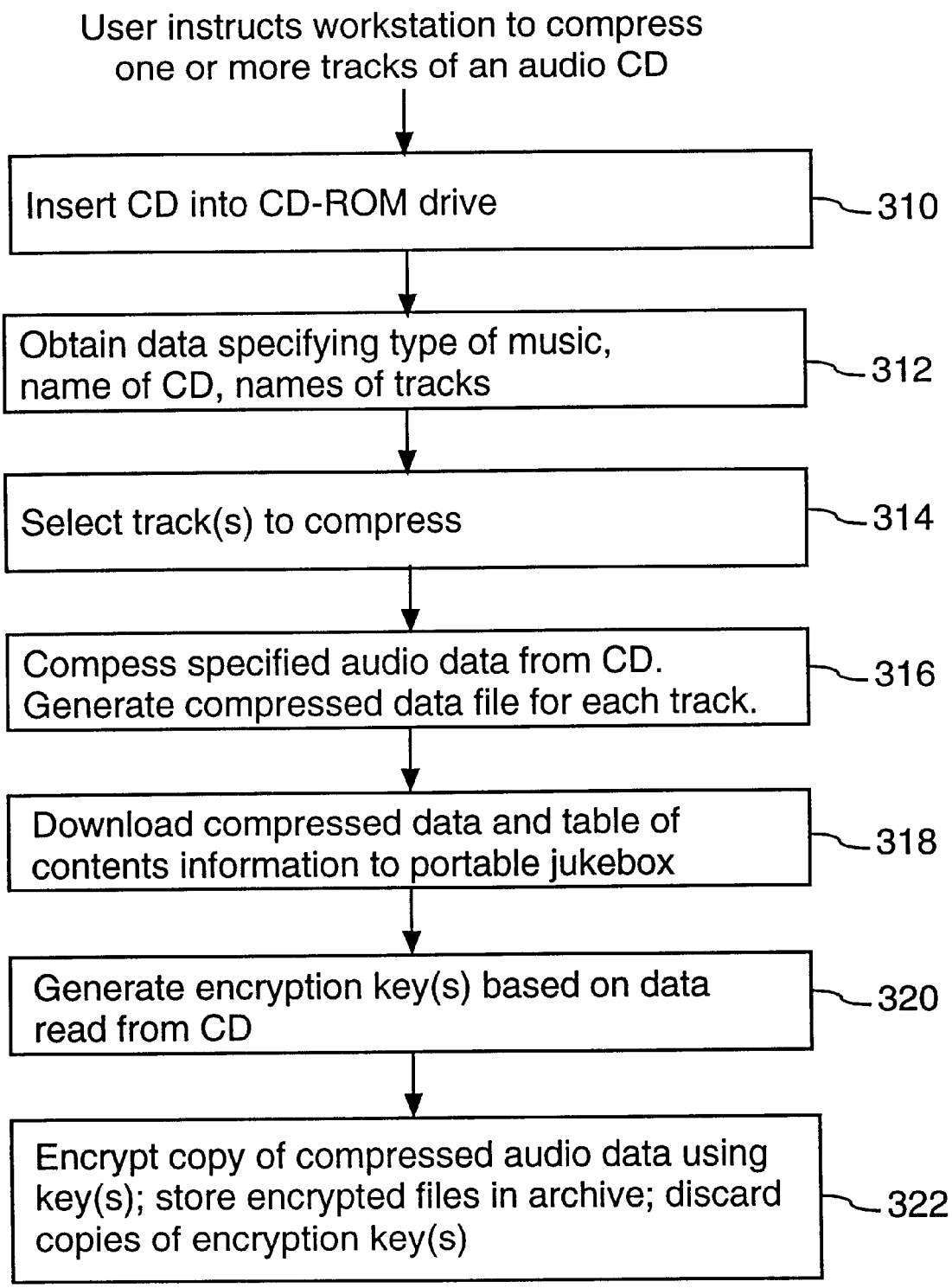
FIG. 3 is a flow chart of a method for loading data onto a portable audio player and storing an encrypted back-up copy of that data according to one embodiment of the present invention.

Referring to FIG. 3, when a user inserts a CD 210 into CD-ROM drive 208 (310) and initiates the portable jukebox storage control procedure 254, the portable storage control procedure obtains information regarding the CD 210 and displays this information to the user (312). In one embodiment, system 200 obtains information regarding the CD 210 from one or more databases 230, such as the CDDB database on the Internet 229. In another embodiment, the information that is displayed to the user is obtained directly from the CD.

Next, the user selects the tracks 150-1, 150-2 of data on CD 210 that the user wishes to download to portable jukebox 100 (314). When the user's choices are received, system 200 compresses the selected tracks using audio compression procedure 246 (316). In one embodiment, MP3 compression is used to produce CD quality compressed audio data having an associated play rate of 128 kilobits per second, although it will be recognized by one of ordinary skill in the art that any suitable compression procedure could be used.

Once the selected tracks 150-1, 150-2 are compressed, they are downloaded (318) to portable audio player 100 via portable jukebox connector 226, where they are stored on the portable audio player's hard disk 104. Preferably, a table of contents 152 containing the user's selections and corresponding data obtained from CD 210 and/or database 230 is also downloaded.

If a backup copy of the compressed audio data is desired, then cryptographic key generation procedure 250 is invoked to create a cryptographic key based on the data contained on CD 210 (320). Preferably the key that is chosen is a relatively large number mechanically derived from the digital content of the CD, a relatively long key having the advantage of discouraging unauthorized regeneration of the key and decryption of the encrypted files.

The generation of an encryption key from the audio data on an audio CD is somewhat more difficult than one might suppose, because audio data cannot be reliably read from an audio CD. In other words, the rate of data reading errors is much larger than for other digital memory media. These reading errors generally are too small and short in duration to audibly affect the quality of the sounds generated when playing an audio CD, but are more than sufficient to make the specific digital value read from the audio CD unreliable. In one embodiment, the encryption key is generated by reading data from a predefined portion of the audio CD (e.g., certain sets of bits in the first megabit of data on the audio CD) number times (e.g., twenty or more times). Then, for each bit to be used to generate the key, a consensus value is derived from the multiple readings of the audio CD data. If a clear consensus value cannot be determined for any bit, a replacement bit is selected using predefined criterial, for each bit of unreliable data. For instance, unreliable bits could be replaced with known reliable bits at predefined offsets from the unreliable bits. Then an encryption key of predefined length (e.g., 64 to 128 bits) is generated from the consensus bits, for example by applying a predefined one-way hash function to the consensus bits (or by using the consensus bits themselves). It will be recognized by those skilled in the art that many other procedures could be used to reliably generate the encryption key from unreliable audio CD data.

Once a suitable encryption key has been generated, the compressed audio data is encrypted using the encryption key and stored in an archive file 257 on the hard disk 214 of computer 200 (322). For example, the compressed audio data could be encrypted using DES or triple DES encryption, or any other suitable encryption methodology. The archive file generated by step 322 preferably includes a header, the contents of which are discussed below with reference to FIG. 4. After the audio data is encrypted and durably stored on nonvolatile memory media, the encryption key is preferably discarded to prevent misuse of the archive file. In one embodiment, the encrypted archive file is stored on another non-volatile storage medium (e.g., a removable memory media such as digital audio tape, diskette, or hard disk cartridge), rather than on hard disk 214. This would be advantageous, for example, to avoid filling up the computer system's main hard disk with backup data that is to be used only rarely, if ever.

Figure 4:
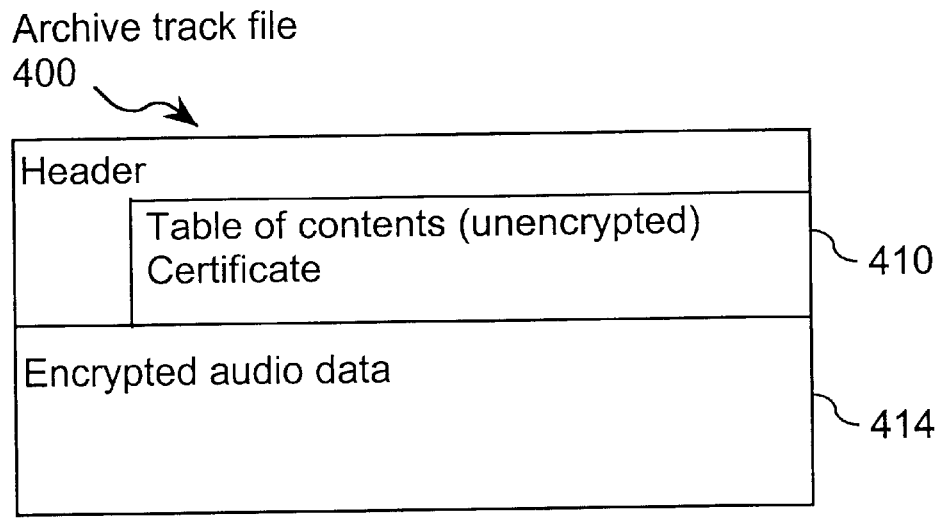
FIG. 4 is a block diagram of the contents of an archive file containing encrypted, compressed audio data in accordance with the present invention.

FIG. 4 is an illustration of an archive file 400 in accordance with the present invention. Archive file 400 preferably includes a header 410 and encrypted audio data 414. Header 410 contains information about the encrypted audio data. For example, the header may contain a copy of a portion of the table of contents 152 that relates to the audio data 414. Preferably, the partial table of contents is stored in the archive file in unencrypted form, thus enabling the user to view information (e.g., title, author and genre) about the encrypted file without having to decrypt the file and/or access the Internet to get CDDB data. Header 410 may also include a "certificate" that can be used to verify the accuracy of a subsequent decryption operation, as described below, and can also be used to determine whether the original CD 210 has been re-inserted into CD-ROM drive 208. For instance, the certificate may consist of a predefined datum, such as the string "Compaq Authenticity Certificate"

encrypted with the encryption key derived from the audio CD data. Alternately, the certificate may contain encrypted information derived from the audio CD, such as information about the lengths of the audio tracks on the audio CD.

Figure 5:
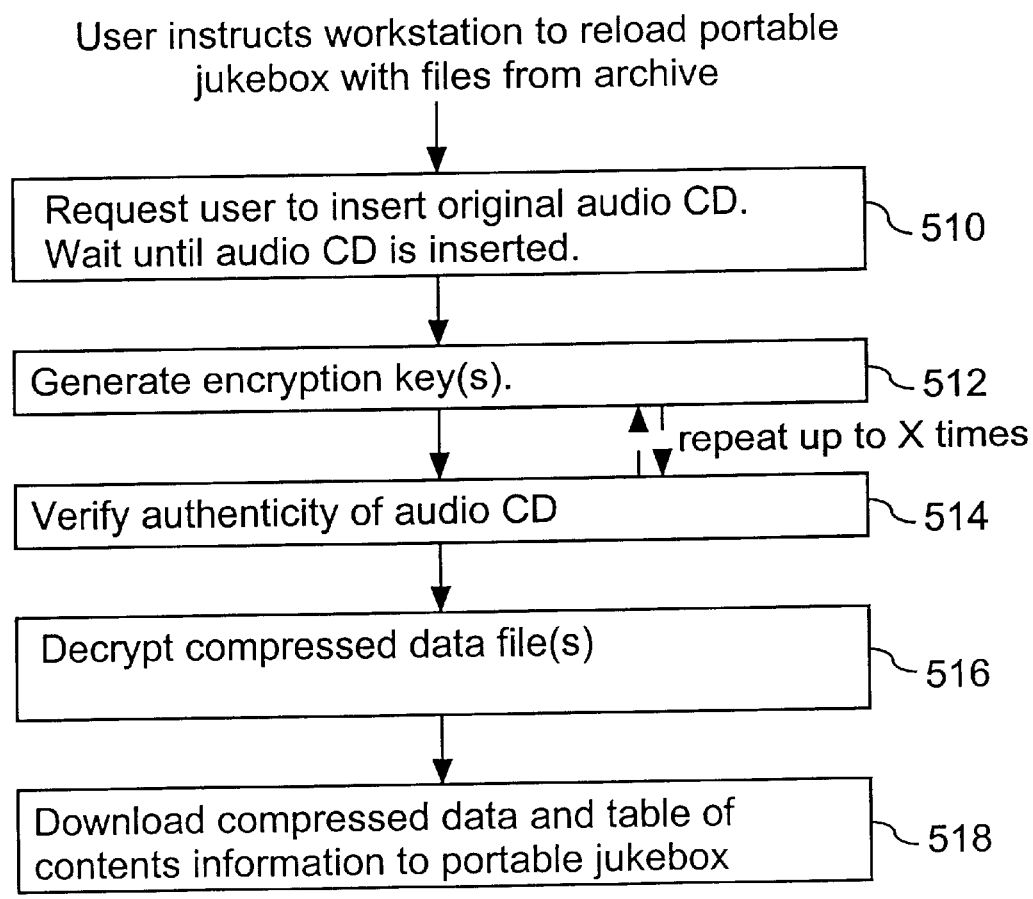
FIG. 5 is a flow chart illustrating a method of reloading audio data onto a portable audio player from an encrypted archive file in accordance with the present invention.

FIG. 5 is an illustration of a procedure for decrypting the encrypted data stored in the archive files 257 on hard drive 214 and reloading these data onto the portable audio player 100.

First, system 200 prompts the user to insert the original audio CD into CD-ROM drive 208. In one embodiment, once the CD is inserted (510), the portable jukebox storage control procedure generates an encryption key from data on the audio CD (512) and uses that key to verify that the CD is the same CD from which the archive file was created (514). In one embodiment, this verification is performed by decrypting the certificate contained in the header of archive file 414, using the encryption key generated in step 512, and comparing the result with a predefined value. In another embodiment, the verification is performed by comparing the decrypted certificate with data obtained by reading data from the audio CD in the CD-ROM drive. If the verification of the certificate fails, this may be due to an error in the re-generation of the encryption key from the unreliable data on the audio CD. Therefore, if the certificate verification fails, steps 512 and 514 are repeated up to X (e.g., twenty) times. If the verification succeeds, the audio CD is known to be authentic and the regenerated encryption key is known to be the same as the one used to encrypt the compressed audio data in the archive file. If the verification fails all X times, the audio CD is presumed to be different from the one used to generate the archive file, and a suitable error message is presented to the user of the workstation.

Once the authenticity of the CD has been established, the regenerated cryptographic key is used to decrypt the encrypted audio data 414 stored in the archive file (516). The decrypted audio data is then downloaded onto the hard disk 104 of the portable jukebox 100.

In another embodiment, the system checks the accuracy of the decryption process at the same time as it verifies the authenticity of the CD. First, the original cryptographic key is regenerated (514). The key is then used to decrypt a portion of the encrypted data. The decrypted data is compared to data read from the CD in the CD-ROM drive 208. If the decrypted portion matches the data read from the CD to a suitable degree (i.e., since the process of reading data from the audio CD is not error free, the two must only match to a predefined degree), then the audio CD in the CD-ROM drive is authentic (i.e., it is either the original CD or an authentic duplicate). However, if the decrypted data does not match the data read from the CD, then either the CD is not authentic, or else the key generation procedure failed to generate an accurate key. Thus, if a match is not found, the key generation procedure is invoked again, a portion of the archived data is decrypted, and a comparison is made between the decrypted data and the data from the CD. This process is repeated until either (a) the CD is determined to be authentic, or (b) a determination is made that the wrong CD is in the CD-ROM drive (such as, for example, if authenticity is not established after a predetermined number of iterations), at which point the user is prompted to insert the correct CD into the CD-ROM drive.

After the data is decrypted and checked for accuracy, it is downloaded to the hard disk 104 of the portable audio player 100 (518).

Alternate Embodiments

In another embodiment of the present invention, the system 200 also determines whether the original portable audio player 100 is coupled to the system 200. If the original audio player is not coupled to the system 200, then decryption of the encrypted archive files is disabled.

Figure 6:
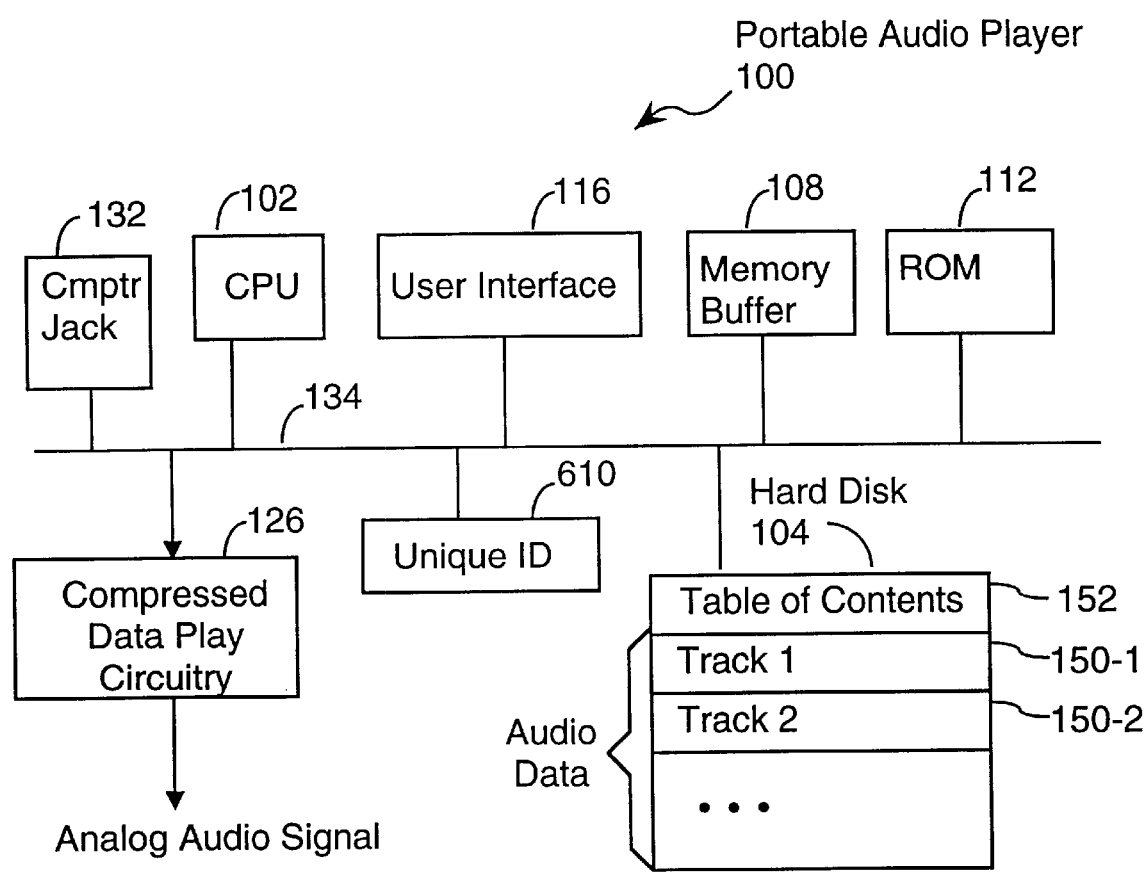
FIGS. 6, 7 and 8 are revised versions of FIGS. 2, 4 and 5 for an alternate embodiment.
Figure 7:
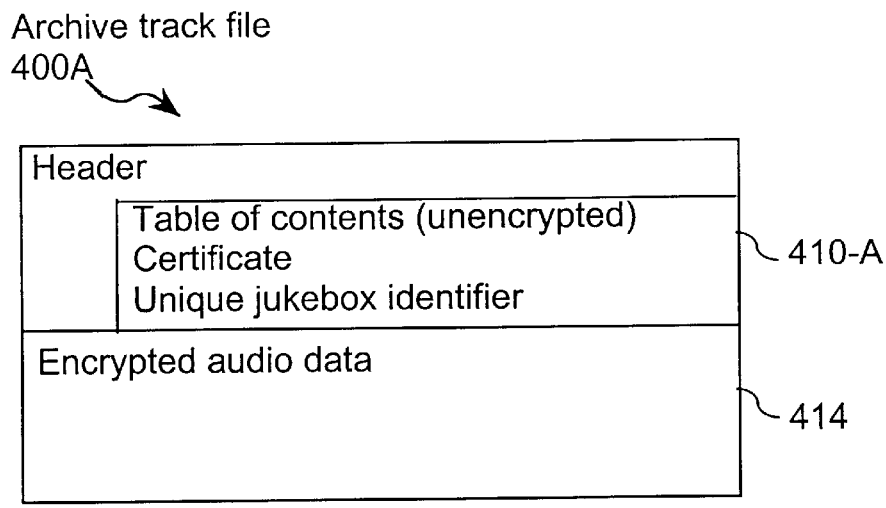
Figure 8:
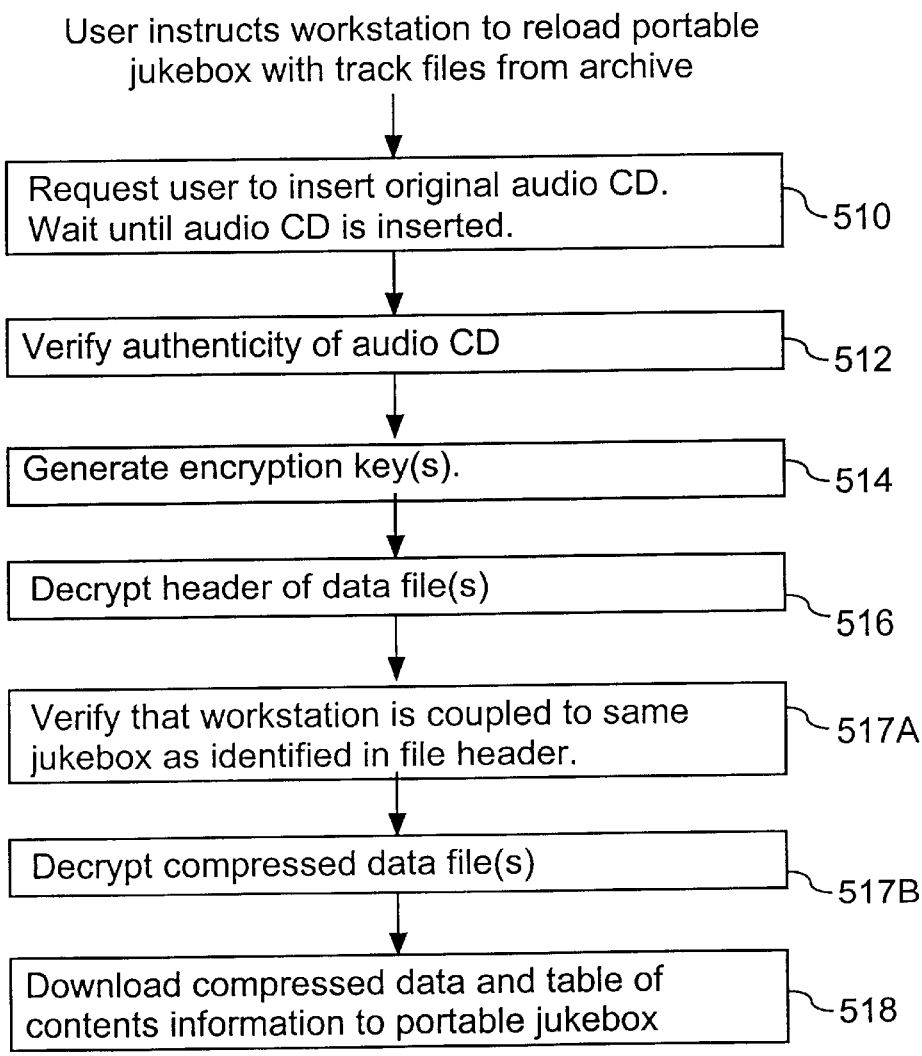

Referring to FIGS. 6, 7 and 8, a unique serial number 610 is embedded in each portable audio player 100. In this embodiment, at step 318 (FIG. 3) of the procedure for storing an archive file, this unique serial number 610 is encrypted and stored in the header 410-A of each archive file 400A. When a user subsequently instructs the system to reload archived data onto a portable audio player, as shown in FIG. 8, the system 200 decrypts the serial number contained in the header of the archive file (516) and then compares the decrypted serial number with the serial number of the portable audio player that is connected to the system via portable jukebox connector 226 (517A). If the serial numbers do not match, the system prompts the user to connect the correct portable audio player to the workstation. Once it is verified that the workstation is coupled to the same portable jukebox as the one coupled to the workstation when the archive file was generated, the compressed audio data in the archive file is decrypted (517B) and the decrypted compressed audio data is downloaded into the portable jukebox (518).

It will be understood by one of ordinary skill in the art that the steps described above could be performed in any suitable order in accordance with the present invention. For example, data from audio CD could be compressed (316) before the user selects (314) which tracks are to be downloaded, or the encryption key could be generated based on uncompressed audio data rather than compressed audio data. [if key is based on compressed data, you'll have to recompress data in order to generate key (time consuming)]

While the present invention has been described with reference to a few specific embodiments, the description is illustrative of the invention and is not to be construed as limiting the invention. Various modifications may occur to those skilled in the art without departing from the true spirit and scope of the invention as defined by the appended claims.

What claimed is:

1. A portable jukebox programming system, comprising:

a memory unit;

a port for coupling the system to a portable jukebox having internal data storage;

a subsystem for receiving audio data from a source communicatively coupled to the subsystem;

a compression module for compressing a portion of the audio data into compressed audio data;

an encryption key generator for generating an encryption key as a predefined function of the audio data;

an encryption module for encrypting the compressed audio data with the encryption key to generate an encrypted backup copy of the compressed audio data, for storing the encrypted backup copy in the memory unit, and for discarding the encryption key, wherein the encrypted copy is not useable without the encryption key; and a transfer module for transferring the compressed-audio data via the port to the portable jukebox for storage therein.

2. The system of claim 1, further comprising:

a backup recovery module, including, an encryption key recovery module for regenerating the encryption key from the audio data when the source is communicatively re-coupled to the subsystem;

a decryption module for decrypting the encrypted backup copy with the regenerated encryption key to generate recovered compressed audio data;

the transfer module including means for transferring the recovered compressed audio data to the portable jukebox.

3. The system of claim 1 wherein the memory unit comprises a removable storage medium.

4. The system of claim 2, wherein the backup recovery module includes a portable jukebox detection module that disables operation of at least one of the encryption key recovery module, the decryption module, and the transfer module when the portable jukebox is not coupled to the port.

5. The system of claim 2, wherein the backup recovery module includes a portable jukebox detection module that compares an identifier embedded in the portable jukebox with an identifier in the encrypted backup copy and disables the transfer module from transferring the recovered compressed audio data to the portable jukebox when the embedded identifier does not match the identifier in the encrypted backup copy.

6. The system of claim 2, wherein the decryption module further comprises decryption verification means for verifying similarity of the compressed audio data and the recovered compressed audio data before enabling the transfer module to transfer the recovered compressed audio data to the portable jukebox.

7. A portable jukebox programming subsystem for use in conjunction with a computer having a memory unit, a port for coupling the system to a portable jukebox having internal data storage, and another subsystem for receiving audio data from a source communicatively coupled to the subsystem; the portable jukebox programming subsystem, comprising:

a compression module for compressing a portion of the audio data into compressed audio data;

an encryption key generator for generating an encryption key as a predefined function of the audio data;

an encryption module for encrypting the compressed audio data with the encryption key to generate an encrypted backup copy of the compressed audio data, for storing the encrypted backup copy in the memory unit, and for discarding the encryption key, wherein the encrypted backup copy is not useable without the encryption key;

a transfer module executable by the computer for transferring the compressed audio data via the port to the portable jukebox for storage therein; and a backup recovery module, including, an encryption key recovery module for regenerating the encryption key from the audio data when the source is communicatively re-coupled to the subsystem;

a decryption module for decrypting the encrypted backup copy with the regenerated encryption key to generate recovered compressed audio data;

the transfer module including executable instructions for transferring the recovered compressed audio data to the portable jukebox.

8. The portable jukebox programming subsystem of claim 7, wherein the backup recovery module includes a portable jukebox detection module that disables operation of at least one of the encryption key recovery module, the decryption module, and the transfer module when the portable jukebox is not coupled to the port.

9. The portable jukebox programming subsystem of claim 7, wherein the backup recovery module includes a portable jukebox detection module that compares an identifier embedded in the portable jukebox with an identifier in the encrypted backup copy and disables the transfer module from transferring the recovered compressed audio data to the portable jukebox when the embedded identifier does not match the identifier in the encrypted backup copy.

10. The portable jukebox programming subsystem of claim 7, wherein the decryption module further comprises decryption verification means for verifying similarity of the compressed audio data and the recovered compressed audio data before enabling the transfer module to transfer the recovered compressed audio data to the portable jukebox.

11. A method of programming a portable jukebox, comprising:

coupling a computer workstation to a portable audio player;

coupling an audio data source to the computer workstation;

receiving audio data from the audio data source;

compressing a portion of the audio data into compressed audio data;

generating an encryption key as a predefined function of the audio data;

encrypting the compressed audio data with the encryption key to generate an encrypted backup copy of the compressed audio data;

storing the encrypted backup copy on the computer workstation;

discarding the encryption key;

transferring the compressed audio data to the portable audio player for storage therein;

re-coupling the audio data source to the computer workstation;

regenerating the encryption key from the audio data;

decrypting the encrypted backup copy with the regenerated encryption key to generate recovered compressed audio data;

transferring the recovered compressed audio data to the portable audio player.

12. The method of claim 11, further comprising:

identifying whether the portable audio player is coupled to the backup system;

inhibiting the decryption of the encrypted backup copy if the portable audio player is not coupled to the backup system.

13. The method of claim 11, further comprising:

comparing an identifier embedded in the portable jukebox with an identifier in the encrypted backup copy and disabling at least one of the decrypting of the encrypted backup copy and the transferring of the recovered compressed audio data to the portable jukebox when the embedded identifier does not match the identifier in the encrypted backup copy.

14. The method of claim 11, further comprising:

comparing the compressed audio data to the recovered compressed audio data, and repeating the regenerating, decrypting, and comparing steps if the compressed audio data is not substantially similar to the recovered compressed audio data.

15. A computer program product for use in conjunction with a computer system having a memory unit, a port for coupling the system to a portable jukebox having internal data storage, and a subsystem for receiving audio data from a source communicatively coupled to the subsystem, the computer program product comprising a computer readable storage medium and a computer program mechanism embedded therein, the computer program mechanism comprising:

- a compression module for compressing a portion of the audio data into compressed audio data;
- an encryption key generator for generating an encryption key as a predefined function of the audio data;
- an encryption module for encrypting the compressed audio data with the encryption key to generate an encrypted backup copy of the compressed audio data, for storing the encrypted backup copy in the memory unit, and for discarding the encryption key, wherein the encrypted copy is not useable without the encryption key;
- a transfer module executable by the computer for transferring the compressed audio data via the port to the portable jukebox for storage therein; and
- a backup recovery module, including,
    - an encryption key recovery module for regenerating the encryption key from the audio data when the source is communicatively re-coupled to the subsystem;
    - a decryption module for decrypting the encrypted backup copy with the regenerated encryption key to generate recovered compressed audio data;
- the transfer module means including executable instructions for transferring the recovered compressed audio data to the portable jukebox.

16. The computer program product of claim 15, wherein the backup recovery module includes a portable jukebox detection module that disables operation of at least one of the encryption key recovery module, the decryption module, and the transfer module when the portable jukebox is not coupled to the port.

17. The portable jukebox programming subsystem of claim 15, wherein the backup recovery module includes a portable jukebox detection module that compares an identifier embedded in the portable jukebox with an identifier in the encrypted backup copy and disables the transfer module from transferring the recovered compressed audio data to the portable jukebox when the embedded identifier does not match the identifier in the encrypted backup copy.

18. The computer program product of claim 15, wherein the decryption module further comprises decryption verification means for verifying similarity of the compressed audio data and the recovered compressed audio data before enabling the transfer module to transfer the recovered compressed audio data to the portable jukebox.

19. A computer data signal, for use in conjunction with a computer system having a memory unit, a port for coupling the system to a portable jukebox having internal data storage, and a subsystem for receiving audio data from a source communicatively coupled to the subsystem, the computer data signal comprising:

- a compression module for compressing a portion of the audio data into compressed audio data;
- an encryption key generator for generating an encryption key as a predefined function of the audio data;
- an encryption module for encrypting the compressed audio data with the encryption key to generate an encrypted backup copy of the compressed audio data, for storing the encrypted backup copy in the memory unit, and for discarding the encryption key, wherein the encrypted copy is not useable without the encryption key;
- a transfer module executable by the computer for transferring the compressed audio data via the port to the portable jukebox for storage therein; and
- a backup recovery module, including,
    - an encryption key recovery module for regenerating the encryption key from the audio data when the source is communicatively re-coupled to the subsystem;
    - a decryption module for decrypting the encrypted backup copy with the regenerated encryption key to generate recovered compressed audio data;
- the transfer module means including executable instructions for transferring the recovered compressed audio data to the portable jukebox.

20. The computer data signal of claim 19, wherein the backup recovery module includes a portable jukebox detection module that disables operation of at least one of the encryption key recovery module, the decryption module, and the transfer module when the portable jukebox is not coupled to the port.

21. The computer data signal of claim 19, wherein the backup recovery module includes a portable jukebox detection module that compares an identifier embedded in the portable jukebox with an identifier in the encrypted backup copy and disables the transfer module from transferring the recovered compressed audio data to the portable jukebox when the embedded identifier does not match the identifier in the encrypted backup copy.

22. The computer data signal of claim 19, wherein the decryption module further comprises decryption verification means for verifying similarity of the compressed audio data and the recovered compressed audio data before enabling the transfer module to transfer the recovered compressed audio data to the portable jukebox.

* * * * *